(12) United States Patent
Leiber et al.

(10) Patent No.: US 7,683,515 B2
(45) Date of Patent: Mar. 23, 2010

(54) ROTATING FIELD MACHINE WITH BELL-SHAPED ROTOR

(76) Inventors: Heinz Leiber, Theodor-Heuss-Strasse 34, D-71739 Oberriexingen (DE); Thomas Leiber, Wesendonkstrasse 87, D-81925 München (DE)

( * ) Notice: Subject to any disclaimer, the term of this patent is extended or adjusted under 35 U.S.C. 154(b) by 358 days.

(21) Appl. No.: 11/630,944

(22) PCT Filed: Mar. 8, 2005

(86) PCT No.: PCT/EP2005/002441
§ 371 (c)(1), (2), (4) Date: Nov. 30, 2007

(87) PCT Pub. No.: WO2006/000260
PCT Pub. Date: Jan. 5, 2006

(65) Prior Publication Data
US 2008/0197738 A1    Aug. 21, 2008

(30) Foreign Application Priority Data
Jun. 23, 2004    (DE) .................. 10 2004 030 063

(51) Int. Cl.
H02K 21/12    (2006.01)
(52) U.S. Cl. .................. 310/156.26; 310/114; 310/266
(58) Field of Classification Search ................ 310/156.26–156.29, 112–114, 266
See application file for complete search history.

(56) References Cited

U.S. PATENT DOCUMENTS

| | | | | |
|---|---|---|---|---|
| 4,973,868 A * | 11/1990 | Wust | ................ | 310/51 |
| 5,783,893 A * | 7/1998 | Dade et al. | ................ | 310/266 |
| 6,380,653 B1 * | 4/2002 | Seguchi | ................ | 310/112 |
| 6,459,185 B1 * | 10/2002 | Ehrhart et al. | ................ | 310/156.45 |
| 6,720,688 B1 * | 4/2004 | Schiller | ................ | 310/64 |
| 6,768,237 B1 * | 7/2004 | Schroedl | ................ | 310/114 |
| 6,794,781 B2 * | 9/2004 | Razzell et al. | ................ | 310/114 |
| 7,105,979 B1 * | 9/2006 | Gabrys | ................ | 310/266 |
| 2006/0071575 A1 * | 4/2006 | Jansen et al. | ................ | 310/266 |
| 2007/0096574 A1 * | 5/2007 | Romagny et al. | ................ | 310/112 |
| 2007/0103027 A1 * | 5/2007 | Jansen et al. | ................ | 310/266 |
| 2007/0108865 A1 * | 5/2007 | Jansen et al. | ................ | 310/266 |

* cited by examiner

*Primary Examiner*—Thanh Lam
(74) *Attorney, Agent, or Firm*—Robert W. Becker; Robert Becker & Associates

(57) ABSTRACT

An electrical drive comprising stationary outer and inner stators; a rotatably mounted rotor with at least one pot-shaped element having a cylindrical wall and a base wall, wherein the cylindrical wall is thin-walled and made of magnetic material, wherein the base wall extends perpendicular and a cylindrical coaxial to a rotor shaft axis and the base wall is connected to the rotor shaft for transfer of torque; at least one electrical excitation coil; and a plurality of permanent magnet elements secured to the rotor for producing an excitation flux, wherein the magnet elements rest only against a radially inner side of the cylindrical wall and in the circumferential direction are disposed next to one another, wherein the magnet elements, together with the stators, form magnetic circuits that pass radially entirely through the cylindrical wall, and wherein the radial thickness of the magnet elements is greater than the thickness of the cylindrical wall.

31 Claims, 9 Drawing Sheets

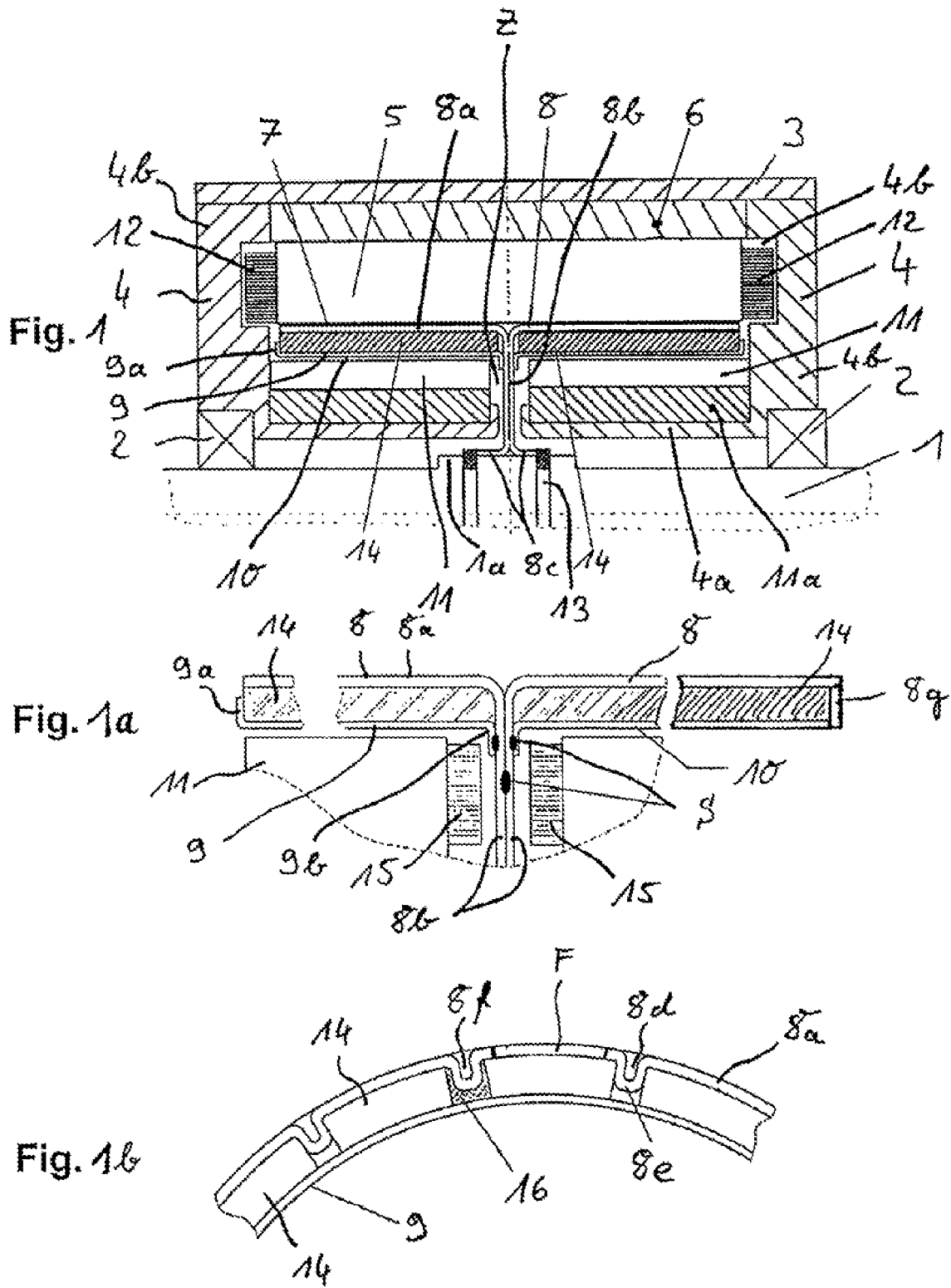

ROTATING FIELD MACHINE WITH BELL-SHAPED ROTOR

BACKGROUND OF THE INVENTION

The instant application should be granted the priority dates of Oct. 18, 2005, the filing date of the corresponding German patent application 10 2004 030 063.1, as well as Mar. 8, 2005, the filing date of the International patent application PCT/EP2005/002441.

Rotating field machines of the type under consideration are also designated as bell-shaped rotors. They generally have a stationary inner and outer stator and a rotatably mounted rotor, whereby the latter is formed by a bell. Permanent magnet elements can be disposed in the bell for a magnetic bias.

The requirements regarding regulatability and the dynamics of electric motors constantly increase. A decisive criterion of the properties of electric motors is therefore the moment of inertia of the rotor or the quotient of generated torque and moment of inertia of the rotor. Particularly good characteristics in this regard are demonstrated by bell rotors, which, however, have a limited torque due to the unidirectional transfer of torque, since the rotor twists too greatly as the torque increases. In addition, bell-shaped rotors have problems with regard to heat dissipation, so that also for this reason the permissible power absorption is limited, which is particularly true if the bell is made of a polymeric material or a winding. In the article by W. R. Canders, H. Masebach, F. Laube "Technologies and Limits of High Torque Drives", page 17ff, a bell-shaped rotor having a rotor provided of permanent magnets is described. The rotor is mounted on the end face bf the housing as well as on the shaft. The permanent magnets are disposed in the rotor between outer and inner stators, whereby not only the outer stator but also the inner stator each carry magnet or excitation coils. The described drives are slowly rotating drives having high torque, whereby the rotor for the most part is comprised of soft iron, resulting in a high moment of inertia. On page 19 of the article, a rotor having only one row of permanent magnets is illustrated, thus leaving to speculation how the permanent magnets are mounted in the rotor. With this embodiment, the outer and inner stators, together with the permanent magnets of the rotor, form a common magnet circuit.

No expedient nor reliable mounting of the permanent magnet elements is disclosed in the above mentioned article. In particular for rapidly rotating field machines, the mounting of the permanent magnet elements pursuant to the article by W. R. Canders is not suitable.

It is therefore an object of the present invention to provide a bell-shaped rotor drive for high speeds having great torque, according to which the permanent magnet elements are reliably mounted.

SUMMARY OF THE INVENTION

This object is inventively realized by an electrical drive having stationary outer and inner stators: a rotatably mounted rotor provided with at least one pot-shaped element having a cylindrical wall as well as a base wall, wherein the cylindrical wall is thin-walled and is made of a magnetic material, wherein the base wall extends perpendicular to an axis of a rotor shaft and the cylindrical wall extends coaxial thereto, and wherein the base wall is connected to the rotor shaft to enable transfer of torque; at least one electrical excitation coil; and a plurality of permanent magnet elements secured to the rotor for producing an excitation flux, wherein the permanent magnet elements rest only against a radially inner side of the cylindrical wall and in a circumferential direction are disposed next to one another, wherein the permanent magnet elements, together with the outer and inner stators, form magnetic circuits that pass radially entirely through the cylindrical wall, and wherein the permanent magnet elements have a radial thickness that is greater than the thickness of the cylindrical wall.

The present invention is based on the concept that a bell-shaped rotor having a small moment of inertia is required if the drive is to be designed for high speeds having high dynamics. A small moment of inertia with a simultaneously high torque and high reliability, as well as protection should the permanent magnet elements be destroyed, is advantageously achieved in that the permanent magnet elements rest at least against the inside of a cylindrical wall of a pot-shaped element. In this connection, the permanent magnet elements are advantageously disposed in only one layer, whereby the cylindrical wall is advantageously made of a magnetic material and has a thin-walled construction. In contrast to the known bell-shaped rotors, it is an essential feature of the inventive drive that the magnetic fluxes of the magnetic circuits that are formed pass radially entirely through the permanent magnet elements as well as the cylindrical wall, in other words, that the outer and inner stators, together with the rotor, form at least one common magnetic circuit. A magnetic short circuit via the rotor does not occur or is negligible.

A particularly good encasement, with a simultaneously easy assembly, can be achieved if the permanent magnet elements are disposed between two cylindrical walls that are coaxially disposed within one another. In this connection, the cylindrical walls are either parts of two pots that are coaxially disposed within one another, whereby their cylindrical walls are spaced from one another by the thickness of the permanent magnet elements. However, it is equally possible for the cylindrical walls to be formed on and/or secured to one and the same base wall. In this connection, at least one base wall is to be connected to the shaft for the transfer of force. A preferred embodiment results if the bell is formed by an outer pot having an inwardly disposed sleeve, whereby the permanent magnet elements are disposed between the sleeve and the outer pot. With this embodiment, the sleeve can be connected to the cylindrical wall or to the base wall of the outer pot, for example by welding.

The invention also provides for a plurality of pot-shaped elements or bells to be disposed axially next to one another on the shaft and to together form the rotor. In this connection, the base-shaped walls of two pots that are disposed next to one another are formed by a common base wall. It is also possible for the cylindrical wall of two adjacent pot-shaped elements to be formed by a common sleeve, whereby the transfer of force is then effected by a common base wall or by two or more base walls from the cylindrical wall to the shaft.

By dividing the magnets to a plurality of pot-shaped elements, the necessary length of the permanent magnets can advantageously be kept small.

It is, of course, also possible to dispose a plurality of permanent magnets next to one another in the axial direction in a pot-shaped element. The same also applies for the arrangement of a plurality of pot-shaped elements that are arranged axially next to one another and that also can respectively have a plurality of permanent magnets that are arranged axially next to one another. The axial length of the pot-shaped elements that are arranged axially next to one another can also differ from one another.

In the circumferential direction, it is particularly advantageous to support two magnets on an appropriate configuration of the pot, for example corrugations, and to fill the intermediate space with a material having a large temperature expansion coefficient (for example casting resin), so that upon transfer of the peripheral forces a temperature compensation is taken into account. This is necessary since the permanent magnets have a very small expansion coefficient.

The previously described pot-shaped elements have a configuration similar to the bells of known bell-shaped rotors. The cylindrical wall is, however, radially supported on the shaft only via the base wall. The cylindrical wall of the bell is preferably made of magnetic conductive material.

The electrical drive can be designed not only as an internal rotor but also as an external rotor, whereby the internal rotor is characterized in that the magnet or excitation coils are disposed on the outer stator. The external rotor is characterized in that the magnet or excitation coils are disposed exclusively on the inner stator. However, it is also possible to provide excitation coils not only on the outer stator but also on the inner stator.

The drive is used either as a continuously rotating motor, a stepping motor or a segmented motor. Similarly, it is also possible to use the drive as a linear drive, in which case the rotor does not rotate about its axis, but rather is displaced back and forth in the axial direction by the magnetic field.

It is also possible for the coils of the outer stator and the permanent magnets of the rotor to be disposed as they are with a transversal flux or flow motor. Such a transversal flux motor is described, for example, in the "Handbook for Electrical Small Drives", Carl Hanser publisher. The inner stator is in this connection to be appropriately designed.

BRIEF DESCRIPTION OF THE DRAWINGS

Various embodiments of the inventive drive will be explained in greater detail subsequently with the aid of the drawings, in which:

FIG. 1 shows an inventive electrical drive having two bells as internal rotors;

FIG. 1a is a detailed illustration of the construction of the bells;

FIG. 1b is a cross-sectional illustration through a bell;

DESCRIPTION OF PREFERRED EMBODIMENTS

Figure 1C:
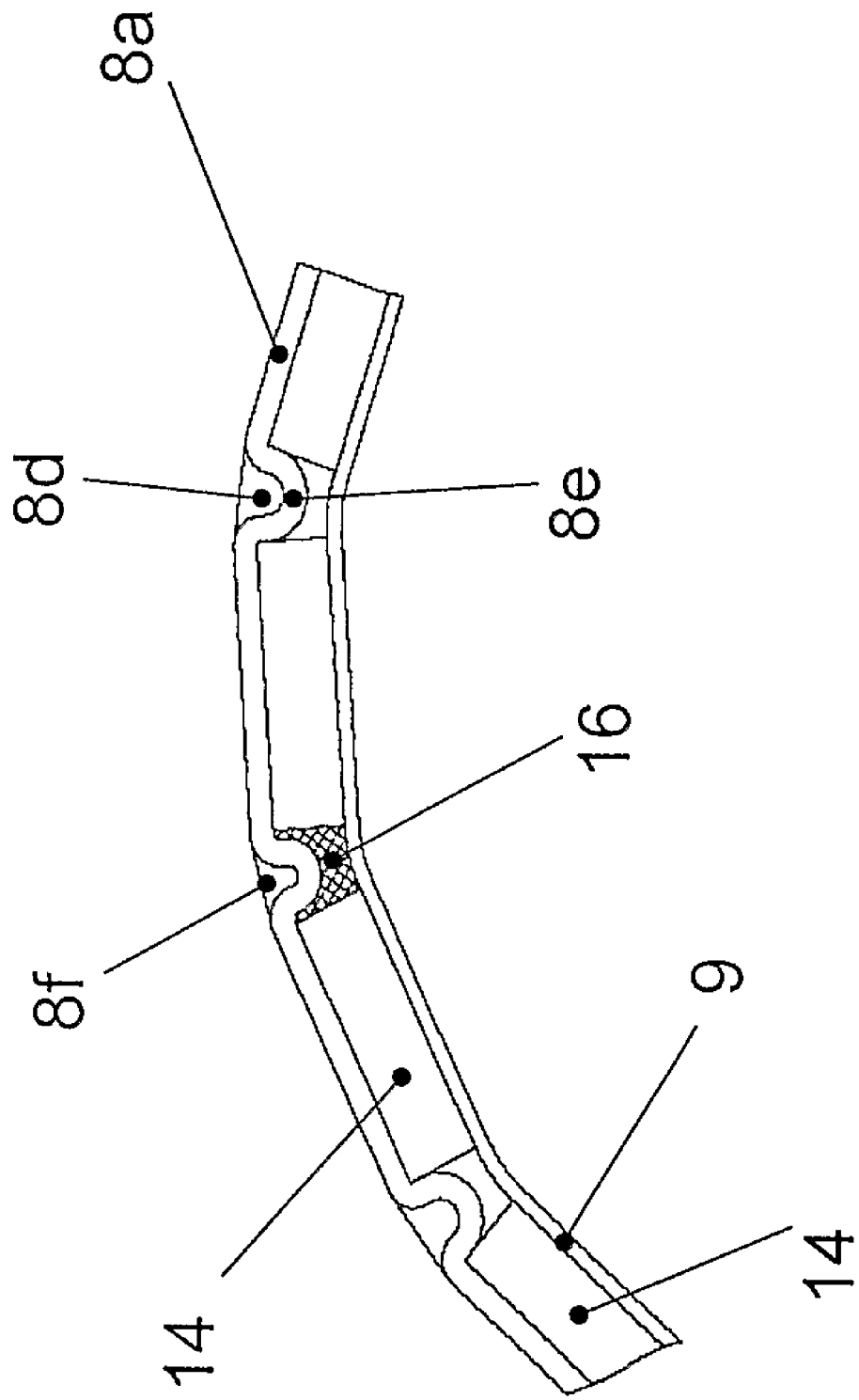
FIG. 1c is a cross-sectional illustration through a bell having permanent magnet elements with a quadrilateral profile.

FIG. 1 shows a longitudinal cross-section through a first embodiment of an inventive drive. To transmit the torque generated in the drive, a drive shaft 1 is provided that, via two roller bearings 2, is rotatably mounted in the housing of the drive. The housing is composed of the two housing portions 4 and the housing cover 3. The housing portions 4 are provided with cylindrical walls 4a that are formed on the end housing walls 4b. The cylindrical walls 4a carry the inner stator 11, 11a, which is in two parts and forms an intermediate space Z in the middle. By means of the intermediate space Z, the base walls 8b of the pot-shaped element 8 extend through and their outwardly directed collars 8c is supported, for example in a positively engaging manner, on the central portion 1a of the shaft 1. In the axial direction, the pot-shaped elements 8 are prevented from shifting axially via retaining rings 13 that are positively disposed in grooves of the central portion 1a of the shaft 1. The disk-shaped base walls 8b of the pot-shaped elements face one another, so that the inner stators 11, 11a, which are disposed on the cylindrical walls 4a of the housing portions 4, are axially insertable into the pots, which have permanent magnets 14 disposed thereon.

Each pot-shaped element 8 has a cylindrical wall 8a that is formed radially outwardly on the base wall 8b and that, together with the sleeve 9 that is disposed toward the inside, forms a chamber for the permanent magnets 14. As can be seen from FIG. 1a, the cylinder 9 is secured to the base wall 8b of the pot-shaped element 8 via weld locations S. For this purpose, the inner cylinder 9 is provided with an inwardly directed collar 9b. In addition, the inwardly disposed cylinder 9a is provided with an outwardly directed collar 9 that holds the permanent magnets 14 in the axial direction. A construction that does not have a sleeve 9 is also possible (see FIG. 2).

The inventive drive illustrated in FIG. 1 is embodied as a so-called internal rotor, in other words, merely the outer stator 5, 6 carries magnet or excitation coils 12 (disposed in the recesses 4c of the housing walls 4b). The inner stator 11, 11a serves merely for the magnetic ground or return path. The poles of the outer and inner stators are embodied in such a way that, together with the permanent magnets 14 that are disposed in the pot-shaped element 8, they form magnetic circuits that pass entirely through the cylindrical walls 8a and 9. In this connection, the permanent magnets 14 provide for a magnetic bias.

Due to the magnetic conductance, the magnetic resistance is predominantly formed by the air gaps.

FIG. 1a shows only portions of the rotor, whereby the inner stator 11 carries magnet or excitation coils 15. The outer stator is not illustrated in FIG. 1a. The pot-shaped element 8, as well as the inner cylinder 9, can be interconnected by weld connections S or by rivets or adhesively. The magnets 14 are held in the bell by optional sleeves 9. The sleeves can also be formed of a magnetically non-conductive material.

A thin-walled component as a bell is prone, in particular with additional deformations, as are described in conjunction with FIGS. 1b and 1c, to deviations in shape. This can be reduced in that, during assembly of the magnet, the bell is inserted into the bore of a device that reproduces the desired contour. After assembly of the magnet, a non-magnetic ring 8g is then pressed in and embedded in casting resin or welded at the end face. In addition to the casting resin, this ring prevents a larger shape deviation when the component is appropriately removed from the device.

FIG. 1b shows a cross-section through a segment of the rotor. The cylindrical wall 8a of the outer pot is provided with corrugations or indentations 8d that extend in the axial direction and between which are mounted the permanent magnet elements 14. The spacing of the indentations 8d relative to one another is somewhat greater than the widths of the permanent magnets 14, whereby the remaining intermediate space is filled with a material or filler 16, for example casting resin, that compensates for the expansion differences of the individual components relative to one another when temperature fluctuations occur. As is known, transverse to the direction of magnetization the magnets have very small or negative expansion coefficients. As an additional security, the inwardly disposed cylinder 9 can rest against the inside of the permanent magnets, as illustrated in the longitudinal cross-section of FIG. 1.

The arrangement of magnet yoke and rotor pursuant to FIG. 1 represents a so-called internal rotor, which has a very small moment of inertia but due to the long pole surfaces and force development on both sides of the permanent magnets achieves a torque that is high relative to the state of the art. The same arrangement can also be embodied as an external rotor with considerably higher torque, but also moment of inertia. If the highest volume-specific torque is demanded relative to the installation space, the external rotor is the proper choice. However, if the smallest torque-specific moment of inertia is required, the internal rotor is the best approach.

The rotor of the inventive drive of FIG. 1 thus comprises two symmetrical, magnetically conductive bells, which on the inner side of the cylindrical surface carry the permanent magnets 14. Providing two bells shortens the acquired length of the permanent magnets 14 in half, as a result of which these magnets can be produced in a more economical manner. By providing the inner cylinder 9, the permanent magnets are additionally protected against breakage. Optionally, window-like cutouts or apertures F (FIG. 1b) can be provided that extend over a large portion of the axial length of the cylindrical surface 8a. The practical purpose of these apertures is to reduce the iron or core losses in the bell as well as the moment of inertia of the rotor. Between the cylindrical walls of the bell and the outer or inner stator respectively is a respective thin air gap 7, 10.

The pot 8 is preferably magnetically conductive, and the sleeve 9 is preferably non-magnetic, although it can also be conductive with a non-magnetic pot. This is necessary to avoid a magnetic short circuit in the rotor.

FIG. 1c shows an outer contour of the bell 8a, and also of the inner cylinder 9, that is adapted to conform to the quadrilateral cross-section of the magnets. The corrugations 8f in the central portion can be smaller, so that the magnets have a small spacing relative to the inner radius of the corrugations; this spacing must be as small as possible. The magnets that rest fully against the corrugations 8d at this location have a small, not-illustrated chamfer in order not to rest against the inner radius of the corrugation.

Figure 2:
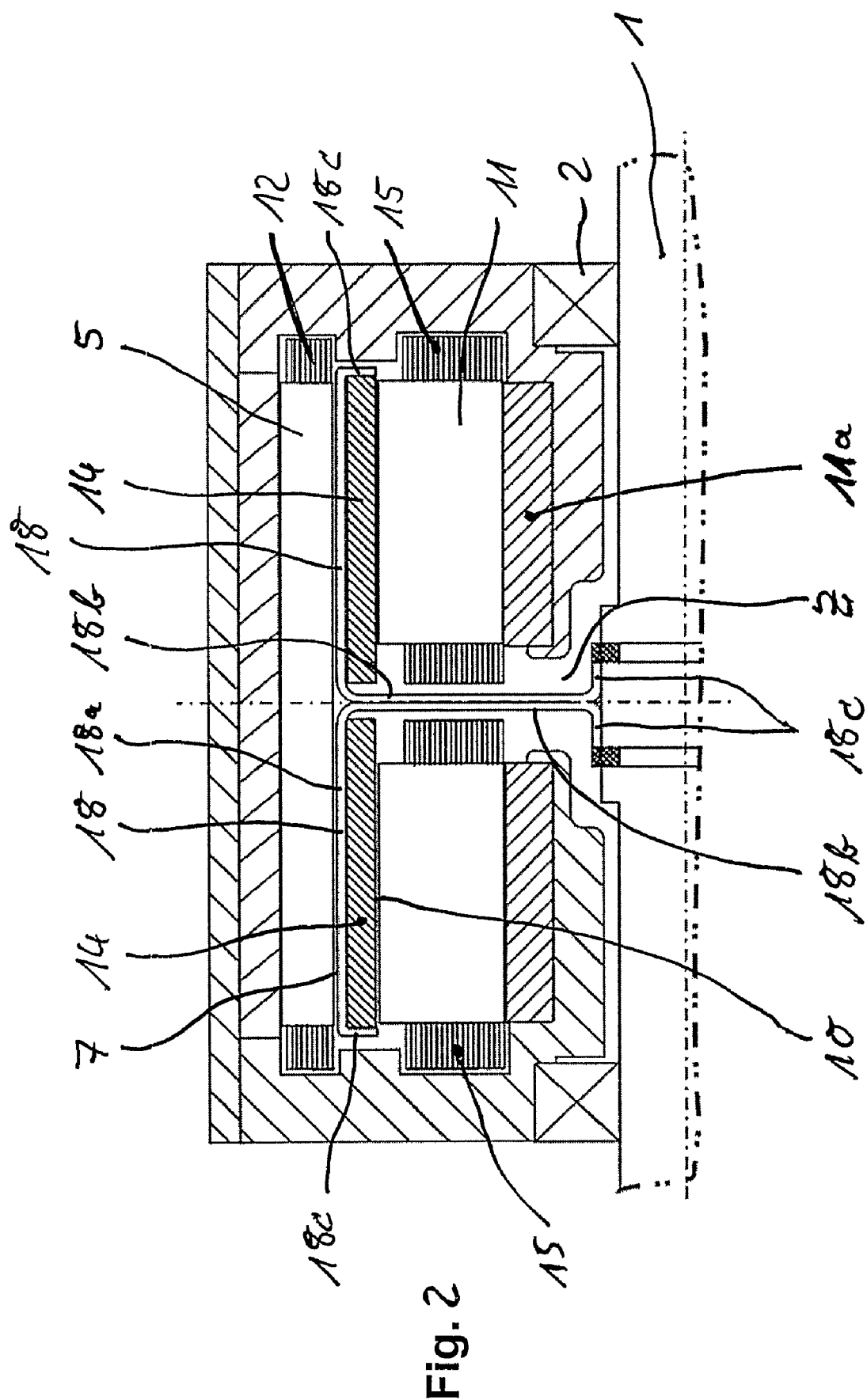
FIG. 2 shows an inventive drive with excitation coils on the outer as well as on the inner stator, whereby the excitation coils of the inner stator critically generate the magnetic flux.

FIG. 2 shows a further inventive embodiment, whereby the two bell-shaped elements 18 rest against one another along their base-shaped walls 18b, and in particular are connected to one another. The permanent magnets 14 are disposed against the inside of the cylindrical wall 18a, and are securely held in the axial direction by the inwardly directed collars 18c. For securement to the cylindrical wall 18a, the permanent magnet element can be glued thereto. However, it is also possible, by appropriate indentations in the cylindrical wall 18a, to achieve a positive interconnection between permanent magnet elements 14 and cylindrical wall 18. In contrast to the embodiment of FIG. 1, not only the outer stators but also the inner stators carry magnet or excitation coils 12, 15. The sleeve described in conjunction with FIG. 1 is not used here. The structural build-up makes small air gaps 7 and 10 possible between the magnets and the stators.

Figure 3:
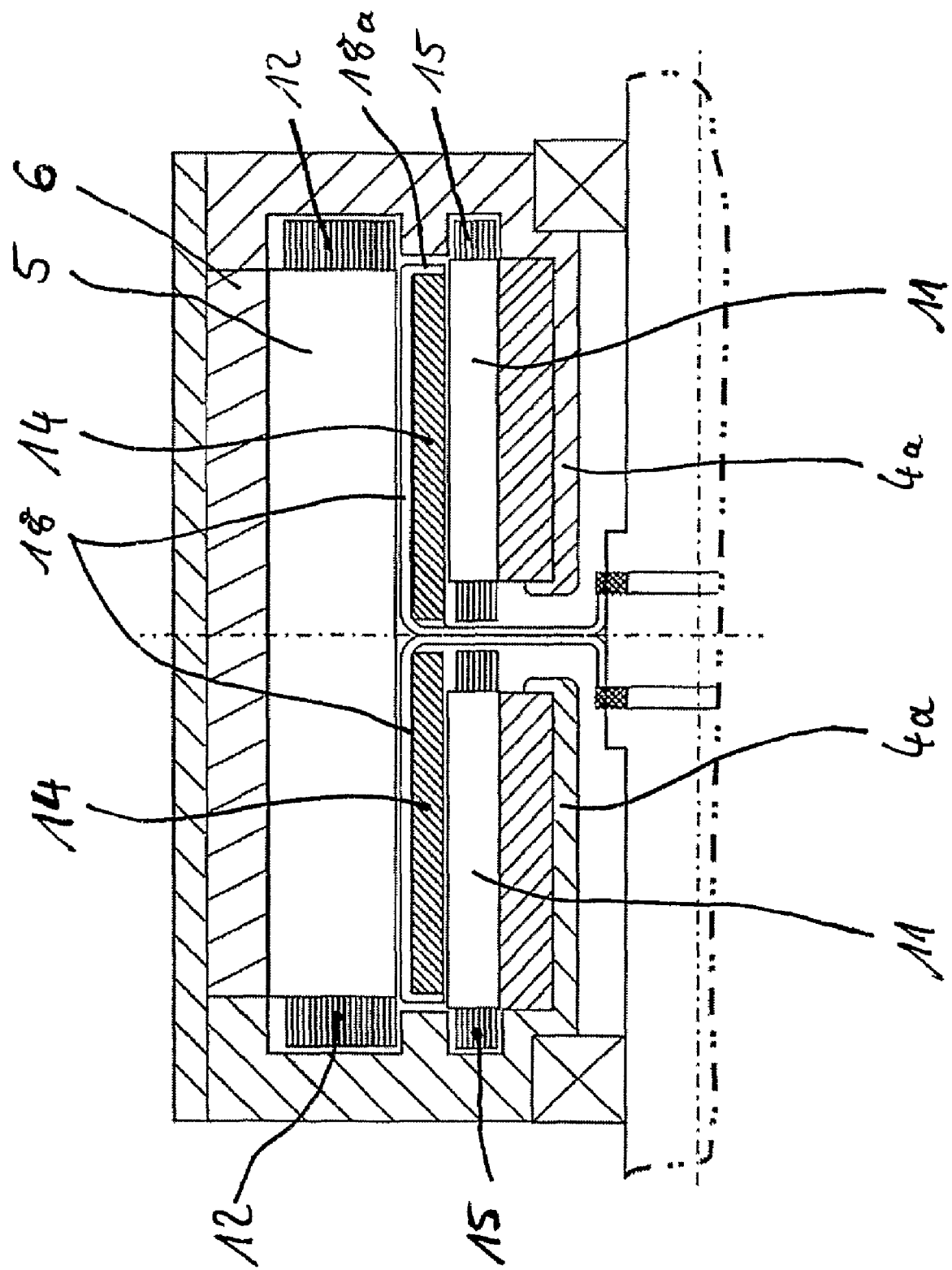
FIG. 3 shows an inventive drive having excitation coils on the outer as well as on the inner stator, whereby the excitation coils of the outer stator critically generate the magnetic flux.

The embodiment of FIG. 3 differs from the embodiment of FIG. 2 merely in that the excitation coils 12 on the outer stator are larger than the excitation coils 15 of the inner stator, which are carried by the inner stator 11. By an appropriate design, as illustrated in FIG. 3, smaller thermal problems result than with the embodiment of FIG. 2.

Figure 4:
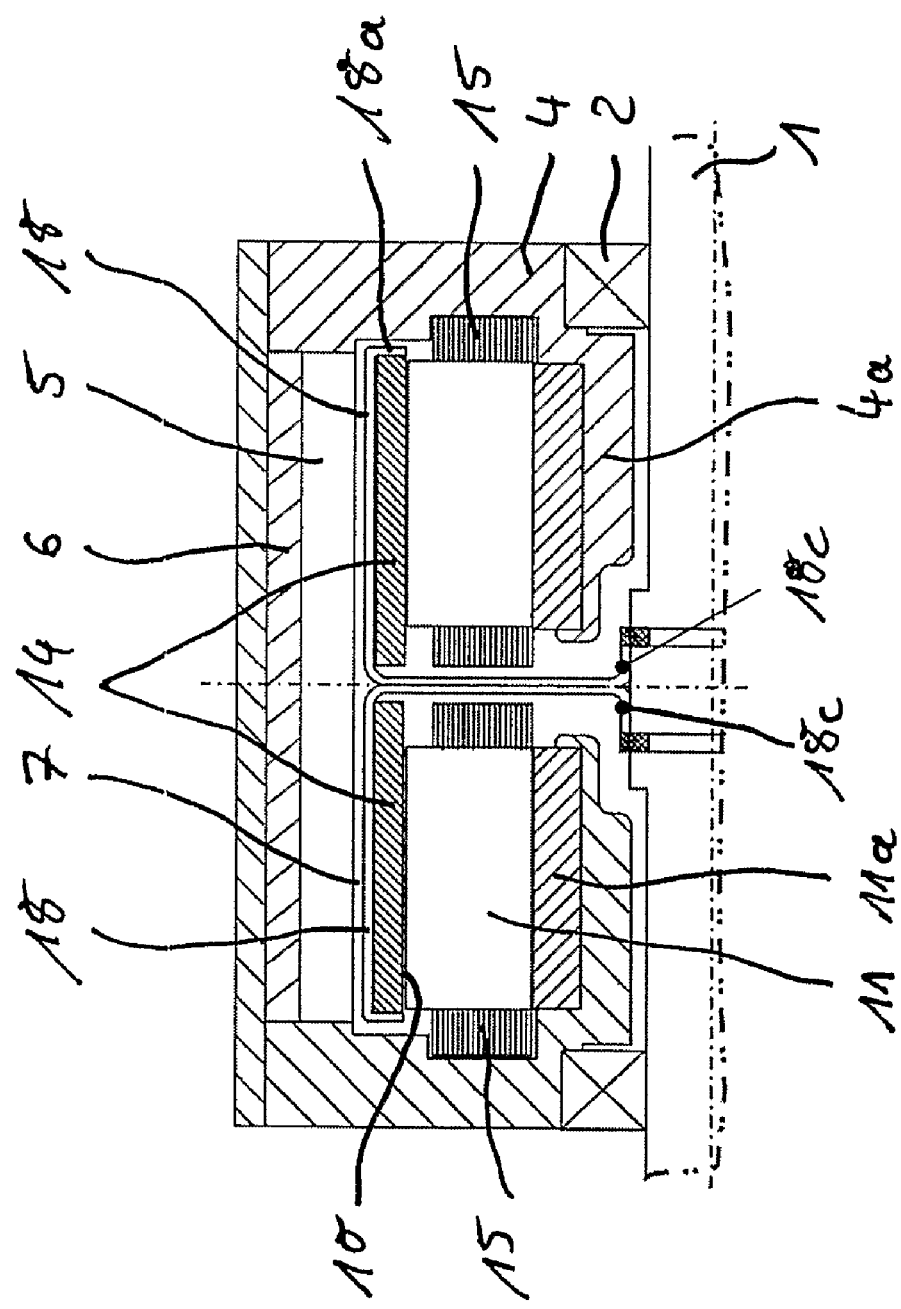
FIG. 4 shows the inventive drive as an external rotor having a single-wall bell.

The embodiment of FIG. 4 is in the form of an external rotor, whereby the construction principle corresponds to that of the embodiment of FIG. 3.

Figure 5:
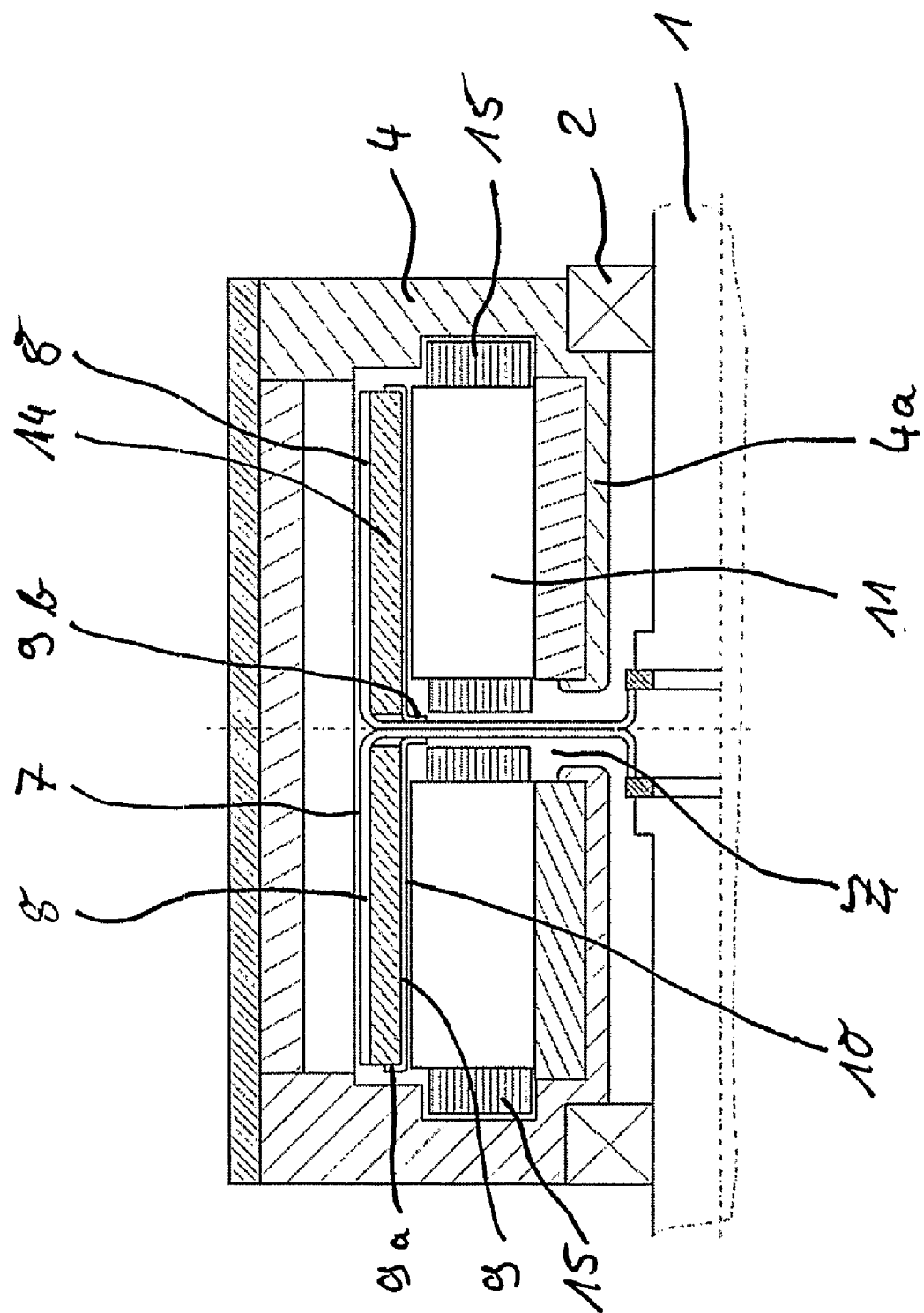
FIG. 5 shows an inventive drive with permanent magnet elements that are radially encased on both sides.

FIG. 5 is also embodied as an external rotor, whereby an inner cylinder 9 is provided for additional securement and encasement of the permanent magnets 14.

Figure 6:
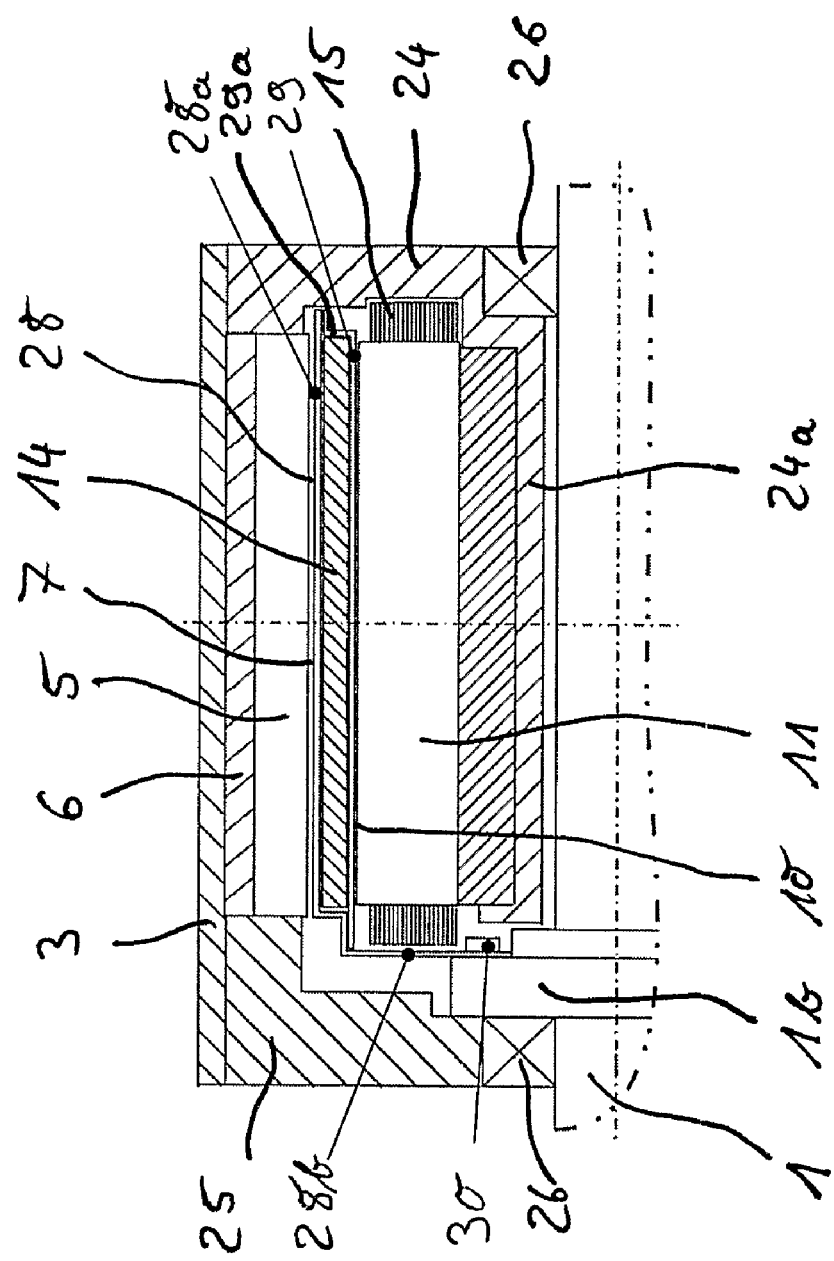
FIG. 6 shows a drive with only a double-walled bell.

FIG. 6 shows a further inventive embodiment having merely one bell 28, the base wall 28b of which is secured to the portion 1b of the shaft 1 by securement means 30 so as to be secure against rotation. The entire axial length of the bell 28 extends around the inner stator 11, which carries the excitation coil 15. The inner stator 11 is mounted on a cylindrical wall 24a of the right housing portion 24. The housing itself is closed off by the cylindrical surface 3 and the further housing portion 25, whereby the shaft 1 is mounted in the housing via bearings 26.

The bell 28 has an outer cylindrical wall 28a on the inner side of which the permanent magnets 14 rest. On the inside, the permanent magnets are held by a sleeve 29 that is secured to the outer cylindrical wall 28a via its collar 29a. In addition, the side of the sleeve that is disposed in the region of the base of the pot can be connected with the cylindrical wall 28a or the base wall 28b. By means of a non-illustrated bearing position for the shaft in the housing 24a, the housing portion 25 can be closed on this side.

Figure 7:
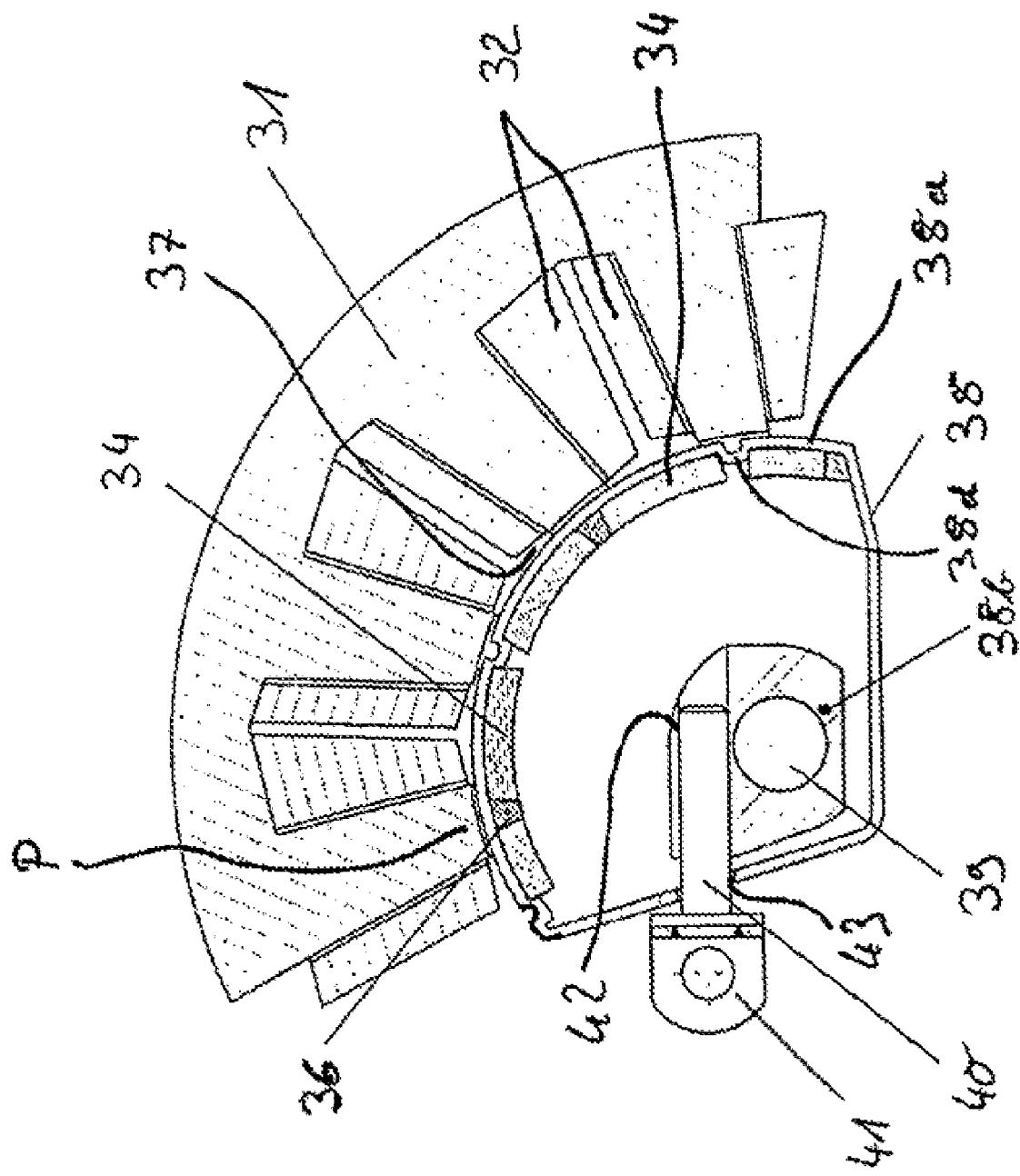
FIG. 7 shows an inventive drive as a segmented motor.

FIG. 7 shows a further possible embodiment of the inventive drive in the form of a segmented motor, which has an asymmetrical bell 38. The magnets 34 are disposed within the bell and are supported in the circumferential direction against the corrugations 38d, whereby temperature compensation elements 36 are disposed at the adjacent permanent magnets 34. The outer stator 31 carries the excitation coils 32. Illustration of the inner stator has been dispensed with. It is similar to the inner stators of the previously described embodiments. The inner stator is not illustrated here. The bell 38 secured to the shaft 39 via its base wall 38b, only a portion of which is illustrated. The transfer of force from the cylindrical surface 38a to the shaft can be effected either at the end of the shaft or within the bell. In addition, it is possible to also use to bells for the segmented motor that have their base sides facing one another. The transfer of force from the shaft to a component that is to be adjusted can be effected via a pin 40, which is pressed into a follower 42 and transfers its force to a coupling element 41. For this purpose, the bell 38 has an appropriate opening 43.

Figure 8:
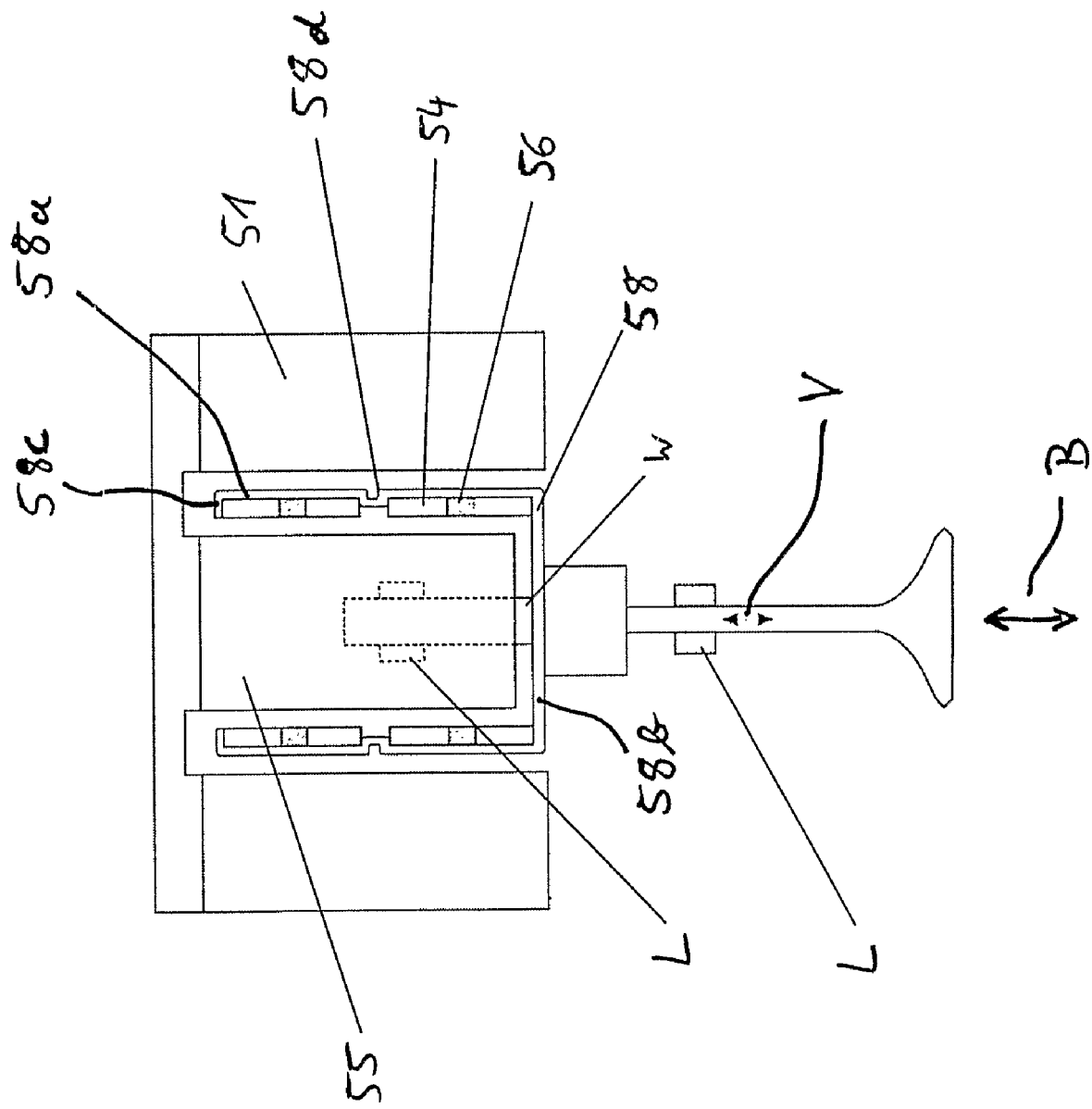
FIG. 8 shows an inventive drive as a linear motor.

FIG. 8 shows a further embodiment of an inventive drive as a linear drive. The magnet system in the inner stator 55 and the outer stator 51 is not illustrated in detail in order to facilitate illustration. The magnets 54 are disposed in the bell 58, whereby they are spaced from one another by temperature compensation elements 56 and are held in position by corrugations 58d in the bell as well as by inwardly directed collars 58c. The cylindrical wall 58a is connected to the shaft W via the base wall 58d. An air gap is between the cylindrical outer surface of the cylindrical wall 58a and the outer stator 51. Similarly, an air gap is between the inner stator 55 and the permanent magnet elements 54. The magnetic flux passes through the cylindrical wall 58a as well as through both air gaps and together with the permanent magnet elements 54 as well as the two stators, forms a plurality of magnetic circuits. The bell can have a round, oval or also right-angled or box-shaped configuration. It is preferably made of magnetically conductive material, and is mounted so as to be displaceable in the axial direction via the two bearings L and via the shaft W. A valve V of an internal combustion engine can, for example, be secured to the shaft W; the valve periodically opens or closes by the upwardly and downwardly moving rotor.

The specification incorporates by reference the disclosure of German application 10 2004 030 063.1 filed 23 Jun. 2004 as well as International application PCT/EP2005/002441 filed 8 Mar. 2005.

The present invention is, of course, in on way restricted to the specific disclosure of the specification and drawings, but also encompasses any modifications within the scope of the appended claims.

The invention claimed is:

1. An electrical drive, comprising:
    stationary outer (5, 6) and inner (11, 11a) stators;
    a rotatably mounted rotor provided with at least one pot-shaped element (8, 18, 28, 38, 58) having a cylindrical wall (8a, 18a, 28a, 38a, 58a) as well as a base wall (8b, 18b, 28b, 38b, 58b), wherein said cylindrical wall is thin-walled and is made of a magnetic material, wherein said base wall extends perpendicular to an axis of a rotor shaft (1, 39, W) and said cylindrical wall extends coaxial thereto, and wherein said base wall is connected to said rotor shaft to enable transfer of torque;
    at least one electrical excitation coil (12, 15, 32); and
    a plurality of permanent magnet elements (14, 34, 54) secured to said rotor for producing an excitation flux, wherein said permanent magnet elements rest only against a radially inner side of said cylindrical wall (8a, 18a, 28a, 38a, 58a) and in a circumferential direction are disposed next to one another, wherein said permanent magnet elements (34, 54), together with said outer and inner stators (5, 6; 11, 11a), form magnetic circuits that pass radially entirely through said cylindrical wall, and wherein said permanent magnet elements have a radial thickness that is greater than a thickness of said cylindrical wall.

2. An electrical drive according to claim 1, wherein said permanent magnet elements (14, 34, 54) are disposed parallel to said cylindrical wall in an axial direction.

3. An electrical drive according to claim 1, wherein said cylindrical wall (8a, 18a, 28a, 38a, 58a) is provided with axially extending and radially inwardly directed indentations or corrugations (8d, 38d, 58d) between and on which said permanent magnet elements (14, 34, 54) are supported or rest.

4. An electrical drive according to claim 3, wherein intermediate spaces between said indentations or corrugations (8f, 36, 56) and said permanent magnet elements (14, 34, 54) are filled with a filler (16, 36, 56).

5. An electrical drive according to claim 1, wherein said cylindrical wall (8a, 18a, 28a, 38a, 58a) is monolithic with said base wall (8b, 18b, 28b, 38b, 58b), or wherein said cylindrical wall is secured to said base wall.

6. An electrical drive according to claim 3, wherein said cylindrical wall (8a, 18a, 28a, 38a, 58a) is provided with window-like apertures (F) in the region of said indentations or corrugations to save weight or for a supply of a filler.

7. An electrical drive according to claim 1, wherein said permanent magnet elements (14, 34, 54) are disposed radially between two cylindrical walls.

8. An electrical drive according to claim 7, wherein a radially inwardly disposed one of said cylindrical walls (9, 29) is connected to said base wall, in particular by welding or gluing.

9. An electrical drive according to claim 1, wherein two pot-shaped elements are provided that are disposed within one another and each have a cylindrical wall, wherein permanent magnet elements (14, 34, 54) are disposed radially between said cylindrical walls of said two pot-shaped elements, and wherein at least one of said pot-shaped elements is positively connected to said rotor shaft.

10. An electrical drive according to claim 9, wherein a radially inwardly disposed one of said cylindrical walls, via its own base wall, forms the second pot-shaped element, which is disposed within an outer one of said pot-shaped elements.

11. An electrical drive according to claim 10, wherein the two base walls of said pot-shaped elements are interconnected.

12. An electrical drive according to claim 1, wherein two cylindrical walls (8a) are provided that are disposed axially next to one another and are disposed against the permanent magnet elements (14), which are disposed inwardly, and wherein at least one base wall (8b) is disposed between said cylindrical walls (8a).

13. An electrical drive according to claim 12, wherein each of said cylindrical walls (8a) forms a pot-shaped element together with a respectively associated base wall (8b).

14. An electrical drive according to claim 13, wherein said two base walls (8b) rest against one another or are interconnected.

15. An electrical drive according to claim 12, wherein said cylindrical walls are secured to said at least one base wall, or wherein at least one cylindrical wall is monolithic with said at least one base wall and the other cylindrical wall is connected to said at least one base wall.

16. An electrical drive according to claim 12, wherein said rotor shaft extends through said at least one base wall, and wherein said base wall is in particular positively secured to said shaft.

17. An electrical drive according to claim 1, wherein said inner stator is disposed within said pot-shaped rotor element, and wherein at least one of said outer and inner stators carries at least one excitation coil.

18. An electrical drive according to claim 1, wherein a plurality of pot-shaped elements having permanent magnet elements are disposed axially next to one another on said rotor shaft.

19. An electrical drive according to claim 18, wherein at least two pot-shaped elements are associated with a common outer and inner stator.

20. An electrical drive according to claim 18, wherein at least one outer stator and inner stator are associated with said plurality of pot-shaped elements.

21. An electrical drive according to claim 1, which is embodied as a segmented motor, wherein said pot-shaped element is merely one segment of a complete pot.

22. An electrical drive according to claim 1, wherein magnetic force is adapted to pivot or rotate said rotor about its axis.

23. An electrical drive according to claim 1, wherein magnetic force is adapted to displace said rotor linearly back and forth in an axial direction of an axis of said rotor.

24. An electrical drive according to claim 9, wherein said at least one cylindrical wall, preferably an outer one of said cylindrical walls, that rests against said permanent magnet elements is magnetically conductive.

25. An electrical drive according to claim 1, wherein only one cylindrical wall is utilized.

26. An electrical drive according to claim 1, wherein said base wall has a thickness that differs from a thickness of said cylindrical wall of said pot-shaped element.

27. An electrical drive according to claim 26, wherein said base wall is thicker than said cylindrical wall.

28. An electrical drive according to claim 1, wherein said base wall is composed of at least two parts.

29. An electrical drive according to claim 1, wherein said permanent magnet elements (14') have a quadrilateral cross-section.

30. An electrical drive according to claim 1, wherein a non-magnetic ring (8g) is disposed at an end face of said pot-shaped element (8).

31. An electrical drive according to claim 30, wherein said ring (8g) is embedded in casting resin that fills intermediate spaces of said pot-shaped element, or wherein said ring (8g) is glued or welded to an end face of at least one cylindrical wall.

* * * * *